(12) United States Patent
de Fontenay et al.

(10) Patent No.: US 7,540,478 B2
(45) Date of Patent: Jun. 2, 2009

(54) HYDROELASTIC BALL JOINT

(75) Inventors: Etienne de Fontenay, Decize (FR);
Philippe Souyri, Saint Genes de Retz (FR)

(73) Assignee: WOCO AVS SAS (FR)

( * ) Notice: Subject to any disclaimer, the term of this patent is extended or adjusted under 35 U.S.C. 154(b) by 0 days.

(21) Appl. No.: 10/824,892

(22) Filed: Apr. 15, 2004

(65) Prior Publication Data
US 2005/0035506 A1    Feb. 17, 2005

Related U.S. Application Data

(63) Continuation of application No. PCT/FR02/03446, filed on Oct. 10, 2002.

(30) Foreign Application Priority Data

Oct. 16, 2001    (FR) .................................. 01 13345

(51) Int. Cl.
*F16F 5/00*   (2006.01)
*F16F 13/14*  (2006.01)

(52) U.S. Cl. .................. 267/140.12; 267/220; 267/294; 267/141.1

(58) Field of Classification Search ............ 267/140.12, 267/141.1, 141.2, 141.3, 217, 219, 220, 281, 267/282, 292, 293, 294
See application file for complete search history.

(56) References Cited

U.S. PATENT DOCUMENTS

| 3,013,808 | A |   | 12/1961 | Willets |
| 4,768,760 | A |   | 9/1988 | Le Fol |
| 4,822,010 | A |   | 4/1989 | Thorn |
| 5,058,866 | A |   | 10/1991 | Hamaekers et al. |
| 5,092,565 | A |   | 3/1992 | Hamaekers et al. |
| 5,172,894 | A |   | 12/1992 | Hein et al. ............. 267/140.12 |
| 5,190,269 | A | * | 3/1993 | Ikeda et al. ............ 267/140.12 |
| 5,301,414 | A |   | 4/1994 | Gautheron .................... 29/451 |
| 5,439,203 | A | * | 8/1995 | Hadano ................. 267/140.12 |

(Continued)

FOREIGN PATENT DOCUMENTS

DE    4 137 692    7/1993

(Continued)

*Primary Examiner*—Thomas J Williams
(74) *Attorney, Agent, or Firm*—Fitzpatrick, Cella, Harper & Scinto (57) ABSTRACT

The invention relates to a hydroelastic joint that is used to assemble two pieces. The inventive joint comprises an external reinforcement (1) and an internal reinforcement (3), each having a longitudinal axis, and one of which is disposed around the other. Moreover, said joint comprises a first assembly (5) forming a hydroelasctic spring which is disposed between said reinforcements. The aforementioned first assembly comprises a first elastically-deformable element (6) which is shaped in such a way as to define, between the reinforcements, at least one sealed volume (9) that contains a damping fluid (8). A second elastically-deformable element (24) is disposed between the first assembly and the first of said external and internal reinforcements. The invention is characterized in that the second elastically-deformable element (24) is provided with a longitudinal dimension which is smaller than the corresponding longitudinal dimension of the first elastically-deformable element (6). In this way, the transversal deformation of the first elastically-deformable element (6) is limited during the relative tilting of the longitudinal axes of said reinforcements around at least one transverse tilting axis (D).

17 Claims, 5 Drawing Sheets

U.S. PATENT DOCUMENTS

| | | |
|---|---|---|
| 5,492,310 A | 2/1996 | Bungart et al. |
| 5,516,083 A * | 5/1996 | Sprang et al. .......... 267/140.12 |
| 5,887,859 A * | 3/1999 | Hadano et al. ........... 267/141.1 |
| 5,954,317 A | 9/1999 | Meyer et al. |
| 6,224,046 B1 | 5/2001 | Miyamoto .................. 267/281 |
| 6,273,406 B1 | 8/2001 | Miyamoto et al. ..... 267/140.12 |
| 6,435,486 B2 | 8/2002 | Maier .................... 267/140.12 |
| 6,622,996 B2 | 9/2003 | Mayerböck et al. ...... 267/141.3 |
| 6,688,588 B2 * | 2/2004 | Vossel et al. ........... 267/140.12 |
| 6,899,323 B2 * | 5/2005 | Takeshita et al. ....... 267/140.12 |
| 2004/0056397 A1* | 3/2004 | Tatura et al. ........... 267/140.12 |
| 2005/0035506 A1 | 2/2005 | de Fontenay et al. |

FOREIGN PATENT DOCUMENTS

| | | |
|---|---|---|
| DE | 4 233 705 | 4/1994 |
| EP | 0524884 | 1/1993 |
| EP | 0 798 487 | 10/1997 |
| EP | 1046833 | 10/2000 |
| FR | 2784152 | 10/1999 |
| FR | 2788822 | 7/2000 |
| FR | 2817007 | 5/2002 |
| JP | 2-136836 | 11/1990 |
| JP | 5-39819 | 2/1993 |
| JP | 9-100861 | 4/1997 |
| JP | 11-37206 | 2/1999 |
| JP | 11-270606 | 10/1999 |
| JP | 2001-32877 | 2/2001 |
| WO | 03/069184 | 8/2003 |

* cited by examiner

HYDROELASTIC BALL JOINT

CROSS REFERENCE TO RELATED APPLICATIONS

This is a continuation of International Patent Application Number PCT/FR02/03446, filed on Oct. 10, 2002, which claims priority to French Patent Application Number 01/13345, filed on Oct. 16, 2001.

BACKGROUND OF THE INVENTION

Field of the Invention

The present invention relates to a hydroelastic joint for assembling two pieces of a structure and for damping vibrations transmitted between each other. More precisely, the invention relates to a joint of the type comprising an external reinforcement and an internal reinforcement, each having a longitudinal axis, which are disposed one around the other and intended to be fixed respectively to one and to the other of the pieces to be assembled, and an assembly forming a hydroelastic spring disposed between said reinforcements in order to allow a relative transverse displacement between said reinforcements, said assembly comprising a first elastically deformable element shaped in order to delimit between said reinforcements at least one sealed volume containing damping fluid.

These joints are likewise designated by the terms support, strut, sleeve or "bushing". They have two main functions: to offer degrees of freedom between the pieces which they assemble and to damp, to a greater or lesser extent according to the intended application, the transmission of vibrations between one and the other of these pieces.

In the field of automotive vehicle construction, these joints are used in particular for the assembly and damping of ground contact members, such as axles or suspension triangles of wheel and axle assemblies, relative to the main structure or body of the vehicle.

In this case, it is the displacement modes in the longitudinal direction of the vehicle, at which the damping is particularly aimed, such as the backward movement of a wheel on contact with an obstacle. Known vibration sources at the level of the ground contact members of a vehicle are also the unbalance of the wheels, the non-uniformity of the tyres when running, faults in the brake discs and devices for assisting braking. The vibrations of the ground contact members are generally characterised by relatively low resonance frequencies, for example between 15 and 20 Hz, and relatively high amplitudes, for example of the order of one millimeter or more, such that they are perceptible by the occupants of the vehicle if incorrectly damped.

Figure 9:
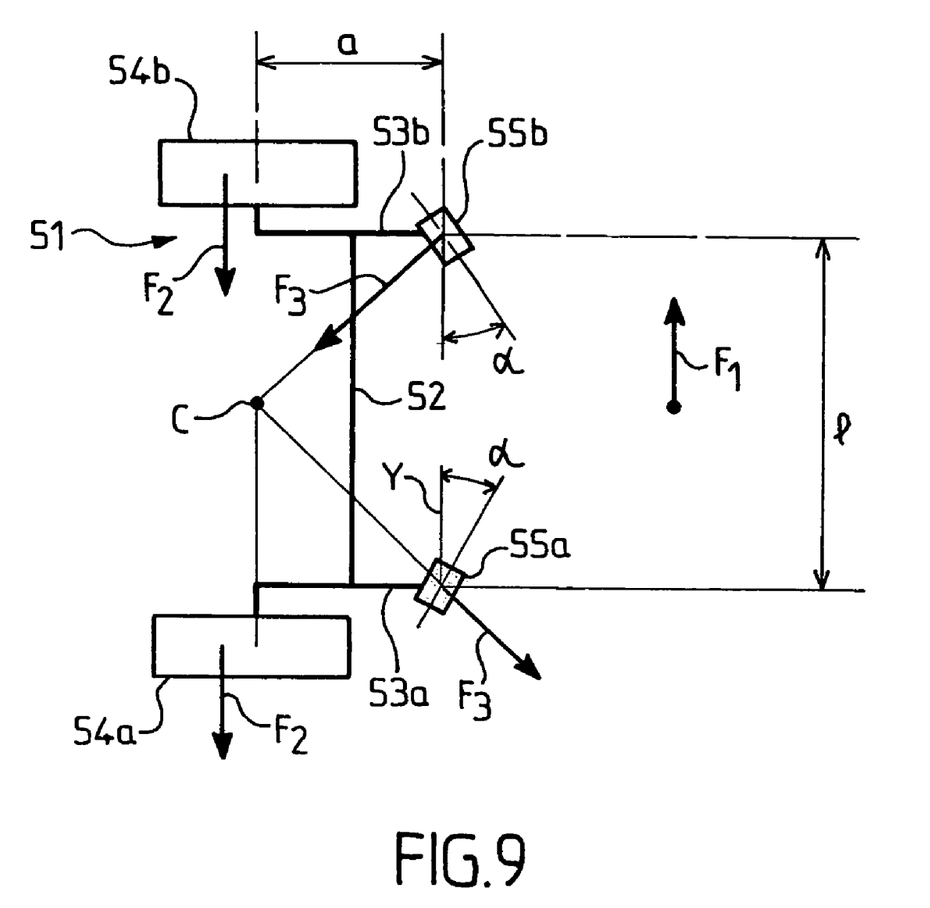

For example, it is known to fix, by means of two joints of this type, a deformable axle, termed as H, to the body of a vehicle. These joints ensure in particular the maintenance of the axle during cornering. FIG. 9 illustrates such an assembly.

With reference to FIG. 9, the axle 51 is a rear axle of the deformable type. It comprises a transverse beam 52, which is rigid in flexure and bears on its two ends a respective longitudinal arm 53a, 53b. Each longitudinal arm 53a, 53b bears in turn a respective wheel support, on which a respective wheel 54a, 54b is mounted at a first end, termed rear end, and a joint 55a, 55b at the other end, termed front end. Each joint is fixed to the longitudinal arm by one of its reinforcements, internal and external, and fixed to the body of the vehicle, which is not represented here, by the other reinforcement.

During cornering of the vehicle, on the one hand the lateral inertia force F1 being exerted on the body and, on the other hand, the lateral frictional force F2 being exerted on the wheels, cause, between the axle 51 and the body, a displacement which can be broken down into a translation according to the transverse direction of the vehicle and a rotation about a vertical axis. This joint displacement and deformation of the axle can cause the vehicle to oversteer: the back wheels, having a very significant steering power, increase the steering lock which increases in turn the inertia forces etc.

In order to correct this fault it has been considered to use self-steering elastic joints, the rigidity of which in the various directions, in particular axial and radial, are controlled and orientated relative to a reference system connected to the vehicle in order to bring about a displacement of the opposite axle. FIG. 9 illustrates this type of assembly, the longitudinal axes of the joints 55a and 55b being orientated in a horizontal plane in order to form an angle α relative to the transverse direction of the vehicle Y, defined by the wheel supports 54a and 54b. The arrows F3 represent the resultant stress sustained by each joint.

In order to obtain a good level of performance in this type of assembly, as far as the guidance of the axle is concerned, it is necessary that the ratio of the radial rigidity to the axial rigidity of the joints is as high as possible, i.e. the behaviour of each joint is as close as possible to the behaviour of an axial slide. The theoretical center of rotation C of the axle, at the intersection of the action lines of the forces F3, is therefore displaced proportionally towards the actual center of rotation of the vehicle. A high value can be obtained for this ratio, in the known manner between approximately 1 and 4, by designing the assembly as a hydroelastic spring in an appropriate manner.

However, it is not desirable to replace the hydroelastic joints with a real slide because then one would lose any damping of the vibrations, which is hardly permissible from the point of view of the comfort of the vehicle.

Thus, there is always a disadvantage in that the joints of the above-mentioned type are subject to impairment or premature aging when they are subjected to a stress which tends to vary the angle formed by the respective longitudinal axes of the internal reinforcement and the external reinforcement, i.e. to induce a relative tilting movement of said longitudinal axes about a transverse direction perpendicular to the two axes. Such a deformation of the joint is also termed conical deformation.

It is clearly apparent that the joints 55a and 55b are subjected to a conical deformation during a vertical deflection of the wheels 54a and 54b upon contact with non-planar terrain. Another disadvantage results therefrom in that the necessity for limiting the conical deformation within permissible limits, for example with a maximum tilting less than 10°, imposes a constraint upon the orientation which it is possible to give to the joint, which complicates the design of the ground contact members and restricts their performances.

Stresses tending to vary the angle formed by the respective longitudinal axes of the internal reinforcement and the external reinforcement can also appear in numerous other applications of hydroelastic joints.

The reason for such impairment is that the conical deformation stresses the first elastic element by deformation at the level of its ends, for example in tension/compression, shearing, flexion, torsion or any combination of stresses. However, because of the fact that it delimits the sealed volume containing the damping fluid, the first elastic element has end walls which have a transverse dimension and a longitudinal spacing imposed by the volume of fluid to be contained, which determines the effectiveness of the hydroelastic operation. As a result, the amplitude of the transverse deformation at the level of the end walls when the joint is subjected to a conical deformation is able to make the end walls operate in a manner prejudicial to the longevity of the elastomer, for example by transverse tension/compression. One might consider modifying the dimensions, for example transverse, of the walls, but the necessity of preserving the desired rigidity values in all directions restricts this possibility.

Likewise, the transverse compressive pretensioning which it is possible to apply to the first elastic element at the level of its ends is reduced as a result of the fact that such pretensioning tends, either to crush the end walls and to reduce the volume available for the damping fluid if the compression takes place before filling of the volume, or to axially distend the end walls if the compression takes place after filling of the volume. Furthermore, such pretensioning presents great difficulties in implementation.

The document FR 2 784 152 describes a joint of the above-mentioned type which comprises furthermore a second elastically deformable element of a similar design to the first and disposed between the first elastically deformed element deformable element and one of the reinforcements, external and internal, in order to form a second hydroelastic spring mounted in series with the first between the two reinforcements. However, this device does not present a satisfactory solution to the above-mentioned disadvantage since it substantially doubles the spatial requirement and the cost of the joint without preventing, for each of the two elastic elements, premature aging at the level of the end walls under conical deformation.

SUMMARY OF THE INVENTION

The object of the invention is to provide a hydroelastic joint of the above-mentioned type which has an extended operational lifespan under conical deformation. The invention aims also to provide a hydroelastic joint, the ratio of the radial rigidity of which to the axial rigidity is preserved or increased.

The invention aims furthermore to provide a joint which is capable of sustaining over a long period of time a combination of axial torsion and conical deformation.

A secondary object of the invention is to provide a joint which has dynamic and geometric characteristics adapted for the assembly of the ground contact members to the main structure of an automotive vehicle, in particular for damping displacements of these members according to the direction transverse to the joint.

For this, the invention provides a hydroelastic joint of the above-mentioned type, comprising furthermore a second elastically deformable element disposed between said assembly forming a hydroelastic spring and a first of said external and internal reinforcements, characterised in that the second elastically deformable element has a longitudinal dimension less than a corresponding longitudinal dimension of the first elastically deformable element in order to limit a transverse deformation of said first elastically deformable element during a relative tilting of the longitudinal axes of said reinforcements about at least one transverse tilting axis.

The rigidity of each elastic element under conical deformation, termed conical rigidity, is overall proportional to the square of its longitudinal dimension. The invention therefore allows distribution of the deformation resulting from a relative tilting of the longitudinal axes of the reinforcements mainly over the second deformable element, the corresponding rigidity of which is smaller, and which produces thus an elastic trunnion function with axial flexibility. The deformation of the first elastically deformable element is therefore reduced all the more. The two elastically deformable elements behave analogously to two springs mounted in series. Thus, the total conical deformation imposed on the joint is distributed between the two deformable elements as a function, for example substantially inversely proportional, of their respective rigidities. Thanks to the design of the joint according to the invention, a respective conical deformation is obtained for the second elastically deformable element equal at least to 55% of the total conical deformation imposed on the joint between the external and internal reinforcements. Advantageously, the second elastically deformable element absorbs at least 60% of the total conical deformation imposed on the joint and preferably 80% or more of this total deformation. Correspondingly, the first elastically deformable element sustains at least 45% of the total conical deformation, advantageously at most 40% and preferably 20% or less of this total deformation.

Preferably, an intermediate reinforcement is disposed between said first and second elastically deformable elements, said first and second elastically deformable elements adhering on said intermediate reinforcement. Thus, the second elastically deformable element does not interfere with the volume of damping fluid so that its operation is totally independent of pressure variations of the fluid. This design is also particularly advantageous in the case of a joint which has to operate with axial torsion.

In the sense of the invention there is understood by adhesion of two elements the production of a close connection between the material of the two elements with or without the addition of an interposed connection material, as well as by gluing, vulcanisation, welding or otherwise.

According to a particular embodiment of the invention, the first reinforcement and the intermediate reinforcement each have a respective peripheral bulge at the level of surfaces in contact with said second elastically deformable element in order to stress said second elastically deformable element with shearing stress between said peripheral bulges during said relative tilting of the axes of the external and internal reinforcements, the second elastically deformable element also adhering on the first reinforcement.

Preferably, the first elastically deformable element has two end walls in order to define said sealed volume between said end walls, said first elastically deformable element being provided with a peripheral reinforcement for rigidification at least at the level of said end walls in order to receive a reinforcement by fixing without adhesion in order to ensure impermeability of said volume of damping fluid.

Advantageously, said end walls connect in a sealed manner the intermediate reinforcement and a second of said external and internal reinforcements in order to define said sealed volume between the intermediate reinforcement and said second reinforcement, said first elastically deformable element receiving by fixing without adhesion the most external of the intermediate reinforcement and the second reinforcement.

Preferably, the sealed volume is divided into at least two opposite chambers according to a first transverse direction defining a hydraulic damping direction of said assembly forming a hydroelastic spring, said assembly comprising a means for putting said chambers in communication in order to cause a hydraulic damping of said vibrations transmitted between said reinforcements at least according to said first transverse direction.

In this case, the assembly forming a hydroelastic spring has the function of a hydraulic damping spring because its operation requires a circulation of fluid between the two chambers in order to cause damping of the vibrations transmitted between said reinforcements according to said first transverse direction. Schematically, when a vibratory stress is exerted on one of the reinforcements, at least according to the defined damping direction, the latter causes an elastic deformation of the first deformable element, a variation of the volume of the chambers, a pressure difference between them and, finally, a flow of damping fluid via the means for communication. However, because of the inertia of the fluid, this flow is dephased relative to the exciter force which causes damping of the stress transmitted to the other reinforcement.

In this case, according to a particular feature of the invention, the first elastically deformable element has two longitudinal bosses connecting said end walls in order to separate said two chambers, said means for putting the two chambers in communication comprising at least one valve lip fixed to at least one of said longitudinal bosses in order to come into contact with said most external reinforcement of the intermediate reinforcement and the second reinforcement, said valve lip being able to be folded back in order to put said chambers in communication when a pressure difference between said chambers exceeds a threshold value.

Advantageously, the first elastically deformable element has two limit stops projecting substantially at the centre of each chamber in order to limit a deflection between the second reinforcement and the intermediate reinforcement according to said first transverse direction.

Preferably in this case, the limit stops are pretensioned in transverse compression between the intermediate and the second reinforcement.

According to another particular feature of the invention, the second elastically deformable element has a rigidity which is less in at least one second transverse direction in order to define, perpendicularly to said second transverse direction, a preferential transverse tilting axis for said relative tilting of the axes of the external and internal reinforcements. According to the intended applications, it is provided that the first transverse direction and the second transverse direction are parallel or that they form an angle.

Advantageously in this case, the second elastically deformable element has at least two cells which are substantially longitudinal and opposite in said second transverse direction. This design allows modulation of the rigidity of the second deformable element as a function of the transverse directions.

Preferably, the first and second elastically deformable elements are obtained in a single moulding step. This possibility is particularly advantageous for reducing the cost and time for manufacture of the joint which results therefrom.

According to a particular embodiment of the invention, the internal reinforcement is of an overall tubular shape and has a thickened and/or enlarged wall section at the level of at least one of its longitudinal ends in order to provide an increased contact surface with the piece to which said internal reinforcement must be fixed or with a means for fixing said internal reinforcement to said piece.

According to a particular embodiment, the hydroelastic joint according to the invention has at least one external portion which is able to abut on one of said pieces to be assembled in order to prevent a deformation of the joint beyond a prescribed amplitude limit.

The invention likewise aims to propose a vehicle rear axle provided with hydroelastic joints in order to connect said axle to the structure of a vehicle whilst obtaining a self-steering effect in order to correct a displacement and/or a deformation of this axle during cornering.

For this, the invention provides an axle for an automotive vehicle comprising a beam bearing symmetrically at each of its ends a respective wheel support, said beam being provided symmetrically with two joints in order to assemble said beam to a main structure of an automotive vehicle and to damp vibrations, characterised in that said joints are hydroelastic joints according to the invention.

Preferably in this case, said joints are fixed to said beam such that a respective axis of each of said joints forms an angle greater than 20° with a direction defined by the two wheel supports.

BRIEF DESCRIPTION OF THE DRAWINGS

The invention will be understood better, and other objects, details, features and advantages of the latter will appear more clearly in the course of the following description of several particular embodiments of the invention, given solely by way of illustration and in a non-limiting manner, with reference to the appended drawings, in which.

DETAILED DESCRIPTION OF THE INVENTION

Figure 1:
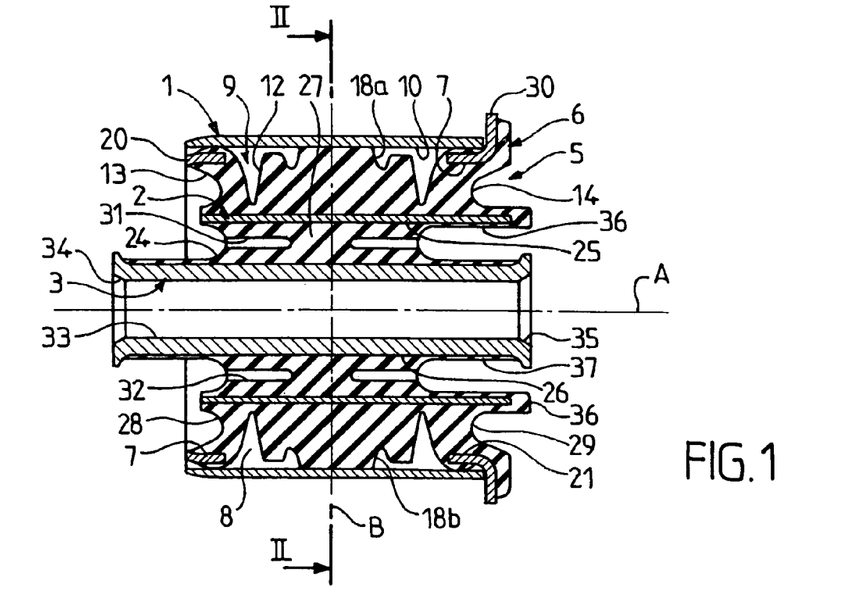
FIG. 1 is a longitudinal section view according to the line I-I of FIG. 2 of a hydroelastic joint according to a first embodiment of the invention.
Figure 2:
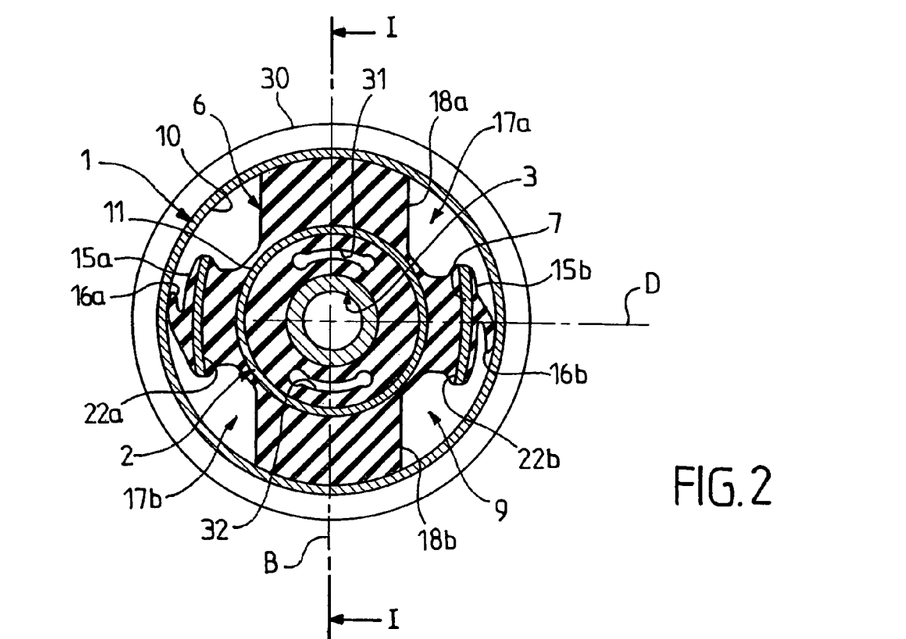
FIG. 2 is a view of the joint of FIG. 1, in transverse section according to the line II-II of FIG. 1.
Figure 5:
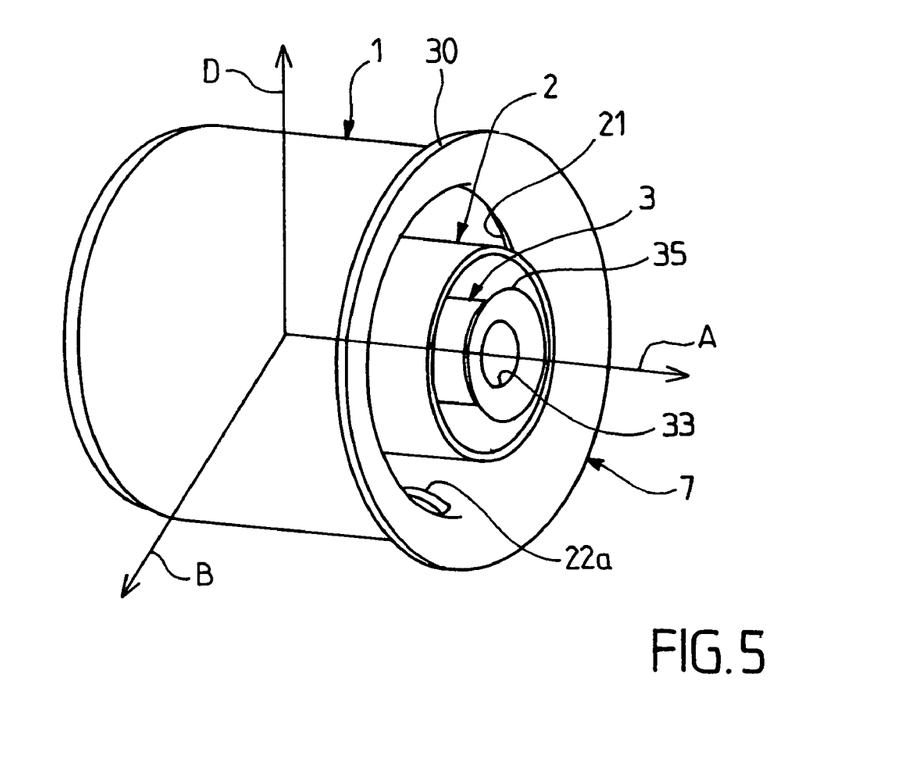
FIG. 5 is a view in perspective of a plurality of reinforcements of the joint of FIG. 1.

With reference to FIGS. 1, 2 and 5, a first embodiment of the hydroelastic joint according to the invention is now described.

In this embodiment, the joint is of a substantially cylindrical exterior shape and has an external reinforcement 1, an intermediate reinforcement 2 and an internal reinforcement 3, all three being substantially cylindrical and coaxial to the axis A. These reinforcements are rigid and made for example of metal or of plastic material. The external 1 and internal 3 reinforcements are intended to be fixed respectively to two pieces of a structure (not represented) in order to assemble these pieces and to damp the transmissions of vibrations between each other. In order to facilitate assembly of the joint between the two pieces, the internal reinforcement 3 projects longitudinally beyond the external reinforcement 1 at the two ends of the joint.

Between the intermediate 2 and external 1 reinforcements, an assembly 5 is mounted forming a hydraulic damping spring formed by a first elastically deformable element 6 made of a composition of one or more elastomer(s) provided with an embedded reinforcement 7, and by a hydraulic damping fluid 8 filling a sealed volume 9 defined between the deformable element 6 and the interior surface 10 of the external reinforcement 1. The deformable element 6 has an overall shape of a hollow cylindrical sleeve which adheres by its interior surface on the exterior surface 11 of the intermediate reinforcement 2 and is recessed on its exterior surface 12 in order to form the volume 9.

The exterior shape of the deformable element 6 is as follows: the deformable element 6 is recessed in a central portion between its two axial ends in order to form, at the level of its axial ends, two annular walls 13 and 14 joining the intermediate 2 and external 1 reinforcements in order to close the volume 9 in a sealed manner.

Two axially diametrically opposite bosses 15a and 15b join the one and the other of the walls 13 and 14 in order to divide the central recess into two substantially semi-annular chambers 17a and 17b which are symmetrical relative to a plane containing the axis A of the joint. The two chambers 17a and 17b are diametrically opposite according to a direction B which defines the hydraulic damping direction of the assembly 5.

The base of each chamber 17a and 17b is formed with a respective protuberance 18a and 18b projecting radially towards the exterior from the centre of the chamber and abutting against the interior surface 10 of the external reinforcement 1. The protuberances 18a and 18b increase the rigidity of the deformable element 6 in the direction B. They are designed with a radial extension greater than the radius of the external reinforcement 1 at the time of moulding the deformable element 6 in order to be pretensioned compressively by the external reinforcement 1 after assembly of the latter on the joint, as will be explained further on. The protuberances 18a and 18b also prevent excessive deformation of the deformable element 6 and resulting damage of the walls 13 and 14 when the joint is subjected to a very large radial stress.

The two bosses 15a and 15b are provided on their respective axial edge with a flexible lip 16a and 16b forming an excess pressure valve. When not in operation, the lips 16a and 16b are in contact against the interior surface 10 of the external reinforcement 1 in order to isolate the two chambers 17a and 17b. The two lips 16a and 16b have a helicoidal orientation in the same direction of rotation about the axis A. In the case of stress of the joint in a radial direction, being expressed by sufficient excess pressure in one of the chambers, for example the chamber 17a, one of these lips, 16b according to the example, is pushed in the direction of its coiling, which causes its flexure against the boss which bears it, 15b according to the example, and the opening of a communication between the two chambers so that the fluid pressure can achieve equilibrium between them. The other lip, 16a according to the example, being on the contrary pushed by the liquid excess pressure in the direction of its uncoiling, is maintained against the external reinforcement 1 and does not open communication between the two chambers: In the case of stress in the inverse direction, the operation of the two lips 16a and 16b is exchanged.

The pressure difference after which the valve lips 16a and 16b open can be adapted by a corresponding design of the latter, by regulating their axial and radial extension, their thickness and the nature of the elastic material which is used. In the known hydroelastic joints, overpressure valves are used which are able to open under very high stress of the joint in order to avoid its rupture. These known valves have therefore a safety function. In this embodiment, the valve lips 16a and 16b serve not only to ensure operational reliability of the joint but also to allow circulation of the fluid between the two chambers in normal operation. Preferably, for the valve lips 16a and 16b, a low opening pressure is chosen, i.e. lower than the values used in the safety valves of traditional hydroelastic joints. For this, the surface of the valve lips 16a and 16b is increased by increasing their axial and deflection lengths and by reducing the radial pretensioning and the thickness of the lips. If desired, the opening pressure can thus be made zero or approximately zero. As a variant, it can be provided that the valve lips 16a and 16b provide, in the non-operational position or in a permanent manner, a limited escape passage between the two chambers.

The deformable element 6 is provided with a reinforcement 7 embedded in the elastomer material. The reinforcement 7 comprises a tubular portion of substantially the same length as the external reinforcement 1, provided in its central portion with two wide substantially semi-annular openings corresponding to the location of the chambers 17a and 17b. The reinforcement 7 therefore forms two rings 20 and 21 embedded in the periphery of the walls 13 and 14 respectively, which rings are joined by two strips 22a and 22b which are parallel to the axis A, are retained radially in their central portion and embedded in the bosses 15a and 15b respectively. The reinforcement 7 has an end portion adjacent to the ring 21, folded back perpendicularly towards the exterior in order to form a peripheral edge 30. The deformable element 6 also comprises, on the exterior face of the end walls 13 and 14, two annular recesses 28 and 29 formed in the elastomer mass, between the intermediate reinforcement 2 and the embedded reinforcement 7.

The closure of the volume 9 is achieved by force-fixing the external reinforcement 1 on the deformable element 6 after filling with the damping fluid, for example glycol. The filling can be effected for example by immersion of the joint in the fluid. During fixing of the external reinforcement 1, the two rings 20 and 21 ensure a strong radial rigidity of the deformable element 6 in order to ensure a sealed contact with the external reinforcement 1 and they prevent the walls 13 and 14 from being ruptured. The deformable element 6 is engaged axially in the external reinforcement 1 by the end corresponding to the ring 20 and until the edge 30, which projects radially relative to the external reinforcement 1, comes to abut against the external reinforcement 1. The deformable element 6 does not adhere on the reinforcement 1 so that the protuberances 18a and 18b do not operate in traction. Optionally, at the time of fixing of the external reinforcement 1, by immersion, a transverse pretensioning of the walls 13 and 14 is achieved, for example by expansion of the intermediate reinforcement 2.

The assembly 5 forming a hydraulic damping spring formed between the external reinforcement 1 and the intermediate reinforcement 2 operates according to the known prior art, a fluid circulation between the two chambers 17a and 17b being produced during relative deflections between the reinforcements 1 and 3 according to the direction B. It should be noted that each chamber 17a and 17b forms a connected space, the fluid being able to pass around the respective protuberance 18a and 18b projecting at the centre of the chamber.

The assembly 5 is designed per se to have a high ratio between the radial rigidity and the axial rigidity. The axial and radial rigidities are controlled mainly by the geometry of the deformable element 6, in particular by the dimensioning of the end walls 13 and 14, of the protuberances 18a and 18b and of the bosses 15a and 15b. For example, the axial and radial rigidities increase when the transverse dimension of the element 6 is increased. According to the known prior art, one can also use saturation effects under stress of the elastomer in order to adapt its elastic behaviour locally.

As a variant, it is possible not to precompress the protuberances 18a and 18b against the reinforcement 1 and even to design them to be shorter so that they do not reach the reinforcement 1 in non-operational state and only come to abut against the latter after a certain transverse deformation threshold.

Optionally, a communication channel of a reduced section can be provided between the two chambers 17a and 17b in order to produce a pressure resonance at a given resonance frequency, according to the known prior art.

Between the intermediate 2 and internal 3 reinforcements there is mounted a second elastically deformable element 24 made of a composition of one or more elastomer(s) adhering on the interior surface 25 of the intermediate reinforcement 2 and on the exterior surface 26 of the internal reinforcement 3. The deformable element 24 forms a sleeve 27 which substantially fills the radial space between the intermediate 2 and internal 3 reinforcements over a smaller length than the length of the deformable element 6. In the sense of the invention, the longitudinal dimension of the deformable element 24 is the length of the portion of the deformable element 24 which is subjected to transverse deformation during a relative tilting of the axes of the reinforcements 1 and 3, i.e. the axial dimension of the sleeve 27 which substantially fills the radial space between the intermediate 2 and internal 3 reinforcements. Therefore, the portions of the deformable element 24 which are not subjected to transverse deformation, such as the portions of film 36 and 37, should not be taken into account in determining the longitudinal dimension of the deformable element 24.

Hence, the deformable element 24 forms a spring which is in opposition to a smaller rigidity than the deformable element 6 during a conical deformation of the joint. The deformable element 24 therefore absorbs the major portion of the transverse deformation caused when the axes of the two reinforcements 1 and 3 are inclined relative to each other, whatever the transverse tilting axis may be. Its corresponding rigidity is all the smaller the more its axial length is reduced.

Two cells 31 and 32 are provided longitudinally in the thickness of the deformable element 24 and diametrically opposite according to direction B in order to reduce the radial rigidity of the deformable element 24 locally in this direction and thus to define, perpendicularly to direction B, a preferred relative tilting axis D between the axes of the reinforcements 1 and 3. In FIG. 2, the cells 31 and 32 are represented as passing through the deformable element 24 along its entire length. As a variant in FIG. 1, each cell 31 and 32 is formed by two semi-cells extending longitudinally opposite each other from the two ends of the deformable element 24 without rejoining in the middle.

During a conical deformation of the joint about the preferred tilting axis D, the rigidity opposed by the deformable element 24 is even less than in the other directions and the transverse stress of the deformable element 6 is even more reduced. However, the use of the joint is not compulsorily limited to conical deformations about the preferred tilting axis D, because the deformable element 24 also allows absorption of the corresponding deformation for any tilting direction.

Since the deformable element 24 adheres on the two reinforcements 2 and 3, it can also operate in axial torsion. The deformable element 24 also allows the ratio of the radial rigidity of the joint to its axial rigidity to be maintained or to be increased. For this ratio of values, for example between 5 and 9, there is obtained the lowest value corresponding to the radial direction of the cells, and the highest value to the perpendicular radial direction. The deformable element 24 therefore fulfils an elastic ball function provided with a certain axial flexibility. The deformable element 24 hence absorbs a portion of the vibrations.

The intermediate reinforcement 2 is completely covered by the elastic material of the deformable elements 6 and 24. In fact, the sleeve 27 formed by the deformable element 24 between the intermediate reinforcement 2 and the internal reinforcement 3 over a shorter axial length than that of the intermediate reinforcement 2, the length of which is substantially equal to that of the deformable element 6, is extended at the level of the ends of the intermediate reinforcement 2 by portions of thin film 36 which cover the remaining portion of the internal surface 25 to the point of joining continuously with the deformable element 6. The film of material 36 is obtained for example by moulding in a single step the two deformable elements 6 and 24. The intermediate reinforcement 2 is therefore protected from the exterior environment and from corrosion.

Likewise, the deformable element 24 is extended at the level of the end portions of the internal reinforcement 3 by portions of thin film 37 which cover the internal reinforcement 3 peripherally up to the ends 34 and 35.

The internal reinforcement 3 has a central axial space 33 which allows a screw to be engaged there for fixing said reinforcement to a piece. The wall of the internal reinforcement 3 is flared and thickened at the level of its two ends 34 and 35 in order to increase the contact surface with the screw and/or the piece, which allows a fixing which is solid and resistant to axial rotational stresses to be ensured. Such a deformation of the ends of the reinforcement 3 is obtained when cold after moulding of the elastic elements of the joint by engaging a rotary tool in the end of a blank of the reinforcement 3 which initially has the shape of a uniform tube. The document EP 524 844 describes this forming technique.

The thickening of the ends 34 and 35 of the internal reinforcement 3 provides an advantage in terms of spatial requirement, of weight and of the price of the joint. In fact, relative to an internal reinforcement which would have a substantially constant diameter equal to the diameter of the thickened ends 34 and 35, it is confirmed that the internal reinforcement 3 has a diameter and a mass which are smaller at the level of the central portion of the reinforcement, whilst the operations of fixing the internal reinforcement are substantially the same in the two cases. For a given fixing operation, the reduction in the diameter of the reinforcement in its central portion allows in turn a reduction in the volume of the deformable element 24 and hence a reduction in the volume of the joint assembly whilst preserving similar permissible rates of conical deformation.

Obtaining this wall thickening by cold-forming after moulding the elastic elements is equally advantageous because the internal reinforcement is still in the state of a tubular blank of a uniform diameter, at least at the level of its ends, during the moulding step. This regular shape facilitates the design of the moulds, in particular the displacement of the mould slides, and therefore facilitates moulding.

The edge 30 formed by the reinforcement 7 allows a support to be produced against an element exterior to the joint in order to prevent an axial deformation of the joint beyond a prescribed amplitude limit. Such a limit stop is often desirable for safety reasons, in particular in exceptional cases of extreme stress of the joint. Correspondingly, the joint can also be provided with an external limit stop according to the radial or angular direction.

Figure 3:
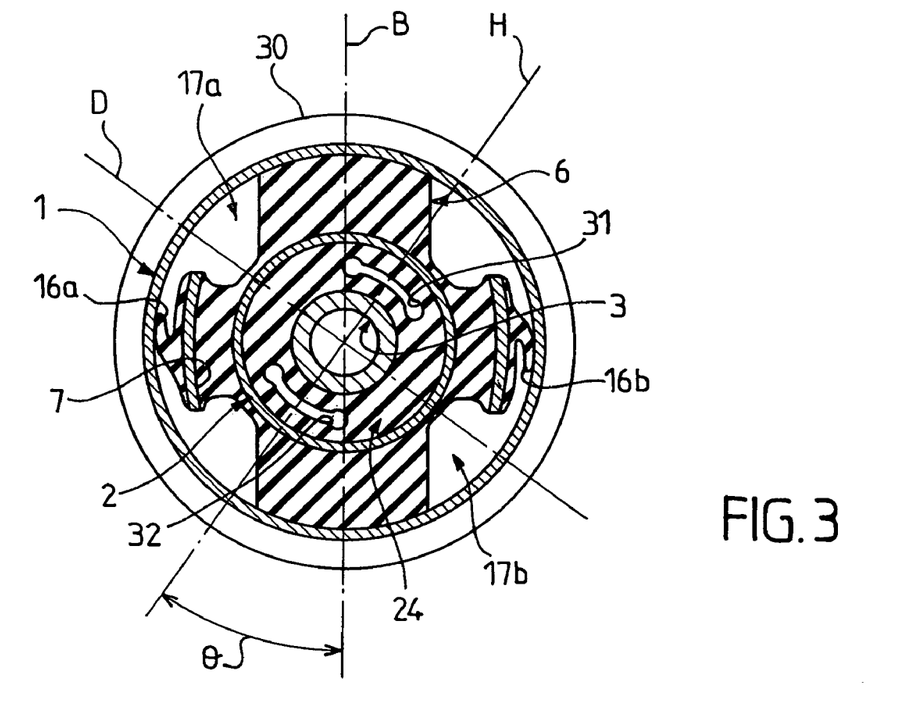
FIG. 3 is a view analogous to FIG. 2 of a hydroelastic joint according to a second embodiment of the invention.

In the embodiment described above, the damping direction of the assembly 5 forming a hydraulic damping spring and the radial direction defined by the cells 31 and 32, which is the direction in which the deformable element 24 is most flexible, are parallel, both being represented by the axis B. There is now described, with reference to FIG. 3, a second embodiment. The elements identical to those of FIG. 2 bear the same reference number and are not described again. In this second embodiment the radial direction H defined by the cells 31 and 32 forms a non-zero angle θ, of the order of 40° in the represented example, with the damping direction of the assembly 5, represented by the axis B. The preferred tilting axis D is by definition perpendicular to the axis H, corresponding to the smallest radial rigidities.

Figure 4:
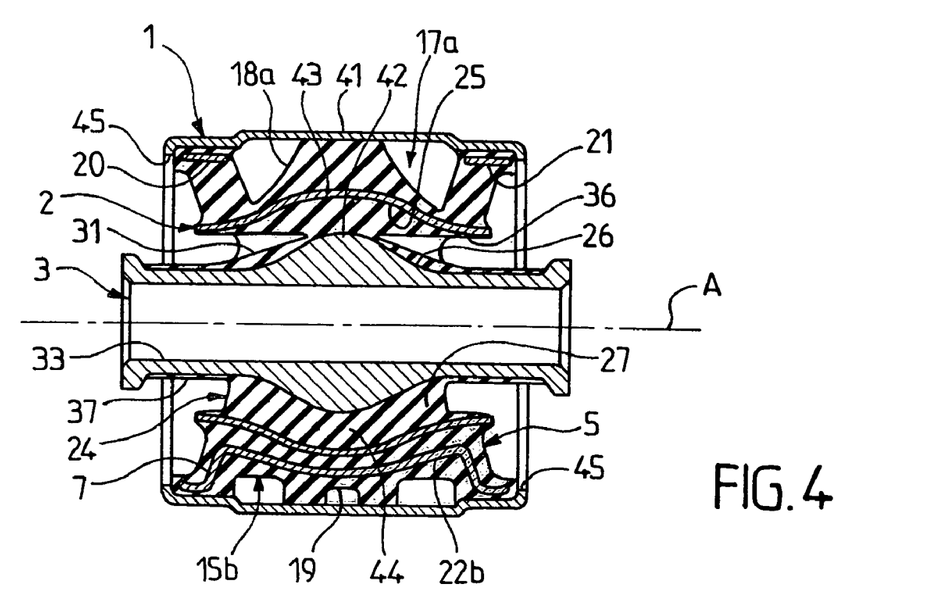
FIG. 4 is a view in longitudinal section of a hydroelastic joint according to a third embodiment of the invention, the upper half-view and the lower half-view being sections according to two half-planes which are axially mutually perpendicular.

There is now described, with reference to FIG. 4, a third embodiment of the invention. The elements analogous to those of the first embodiment bear an identical reference number and are not described again. In FIG. 4, the upper semi-view is sectioned in an analogous manner to FIG. 1, whilst the lower semi-view is sectioned according to a longitudinal plane perpendicular to the sectional plane of FIG. 1.

The joint is designed as in the first embodiment except for the following differences: the internal reinforcement 3 has a convex exterior bulging portion 42 in its central section, in the middle of the joint. The intermediate joint 2 is designed with a convex parallel bulge 43 in its central portion, opposite the portion 42. The bulges 42 and 43 are preferably substantially spherical. The deformable element 24 therefore has, likewise, a shape generated by revolution with a central bulge 44 following the parallel surfaces 25 and 26 and adhering on them. It is subject to shearing stress between the reinforcements 2 and 3 during conical deformations of the joint.

The base of the hydraulic fluid chambers being radially offset towards the exterior in the central portion of the joint, the external joint has, opposite the portion 42 of the internal reinforcement, a central portion 41 of increased diameter in order to preserve a sufficient volume of damping fluid. The external reinforcement 1 also has at each axial end, an edge 45 folded towards the interior in order to retain the deformable element 6 axially in the external reinforcement.

In its central portion, the boss 15b comprises a channel of a rectangular section 19 which is hollowed-out in its exterior surface according to an angular direction of the joint and opening out by its respective ends into the two chambers 17a and 17b. The corresponding valve lip (not represented) is separated into two portions disposed on both sides of the channel 19. The channel 19 forms a passage of limited section for generating a pressure resonance in the assembly forming a hydraulic damping spring 5. It allows the flow of damping fluid between the two chambers when the joint is stressed according to the diametral direction defined by said chambers. The pressure resonance frequency is chosen as a function of the main vibratory modes of the structure which are to be damped. For an automobile axle assembly strut, this resonance frequency is generally between 10 and 100 Hz, for example approximately 20 Hz.

The intermediate reinforcement 2 is of a reduced axial dimension, less than that of the external reinforcement 1. The cells 31 have a section diminishing in the axial direction A towards the middle of the joint and increasing towards its ends. The deformable element 24 adheres along its entire axial length to the reinforcements 2 and 3. The peripheral edge of the reinforcement 7 is omitted.

Figure 6:
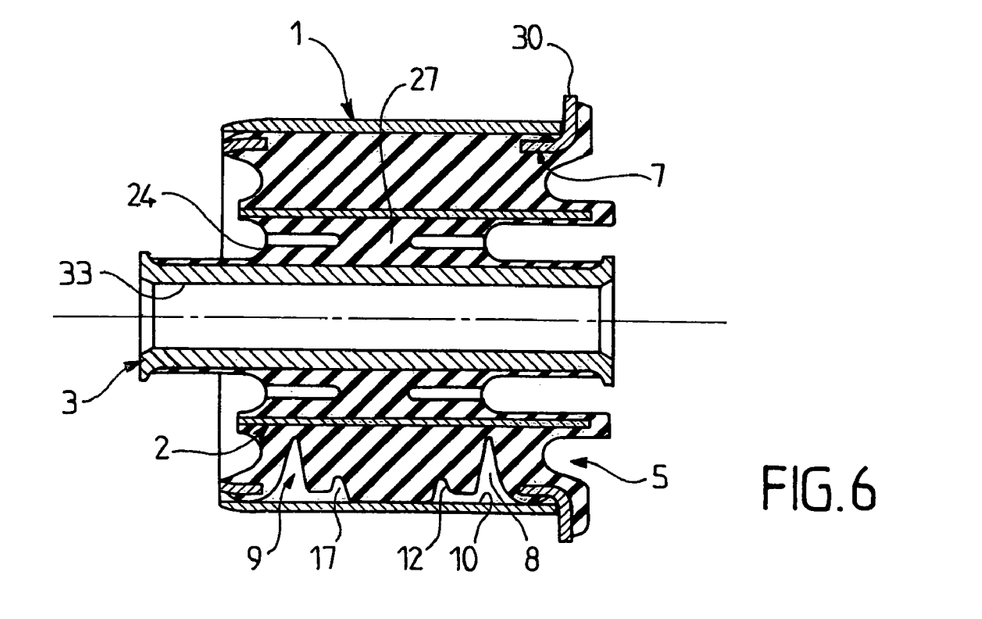
FIG. 6 is a view in longitudinal section of a hydroelastic joint according to a fourth embodiment of the invention.

There is now described, with reference to FIG. 6, a fourth embodiment of the invention. The elements analogous to those of the first embodiment bear an identical reference number and are not described again.

Contrary to the preceding embodiments, the sealed volume 9 comprises only a single chamber 17 occupying overall a semi-annular volume equivalent to that of the chamber 17b of the first embodiment. In this fourth embodiment, the damping fluid 8 occupying the volume 9 is not made to circulate but serves to increase the radial rigidity of the assembly 5 without modifying its axial rigidity. This embodiment allows an increase in the ratio between the radial rigidity and the axial rigidity of the joint in order to approximate the behaviour of the joint to that of an axial slide. The deformable element 24 still ensures the function of the absorption of conical deformations and of a portion of the vibrations. On the other hand, the damping operation of the assembly 5 is notably less than that obtained in the preceding embodiments.

The joint of the fourth embodiment has advantages for guidance of an axle, to the detriment of a part of the comfort of the vehicle. It is however possible to provide a complementary damping means for improving damping when the joint of the fourth embodiment is used to assemble an axle on the main structure of a vehicle.

The joints according to the invention of the embodiments of FIGS. 1 to 6 have the advantage of being able to be produced in a particularly simple and rapid manner, the deformable elements 6 and 24 being able to be obtained in a single moulding step from one or more elastomer mixtures. For this a mould is used which has mould slides with longitudinal movements and mould slides with transverse movements.

The presence of cells in the second deformable element 24 is neither necessary nor limited to the described embodiments. Any number and arrangement of cells can be used to adapt the features of radial, axial and conical rigidity of the deformable element 24. The rigidity of the deformable element 24 can also be adapted according to numerous known methods, for example, by the choice of the type of elastomer mixture and of fillers which are included in this mixture, by dimensioning of the lengths and thicknesses of the elastomer layers, by formation of cells, and by precompression of the deformable element. Such a precompression can be obtained, for example, by restriction of an exterior tube to the relevant layer of elastomers or by expansion of the interior reinforcement. It will be noted that the same mixture or a plurality of different mixtures can be used to produce the two deformable elements 6 and 24.

Figure 7:
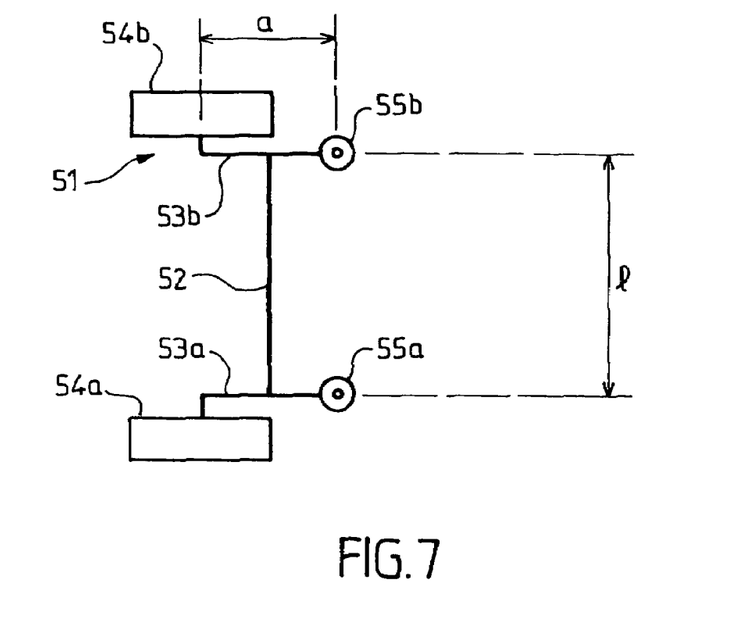
FIGS. 7, 8 and 9 represent in a view from above three embodiments of an axle according to the invention.
Figure 8:
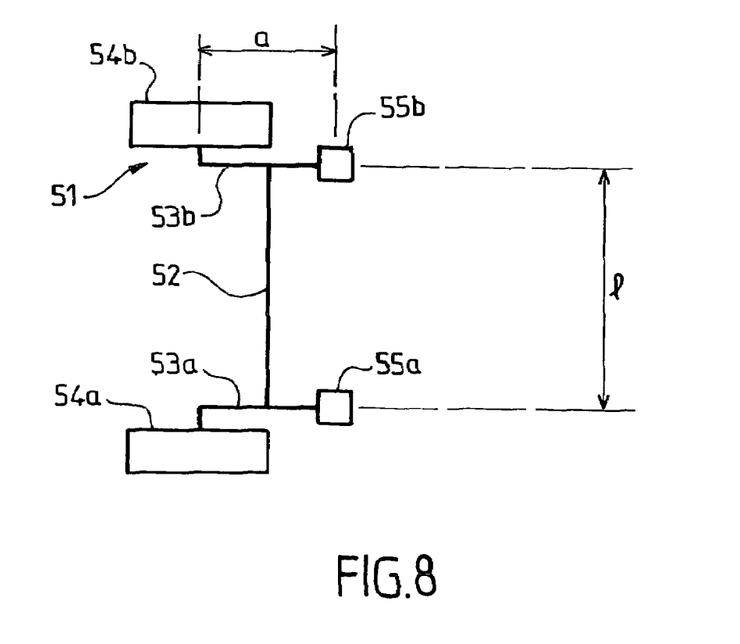

There is now described, with reference to FIGS. 7 to 9, an example of application of the joint according to the invention as an axle assembly strut of an automotive vehicle. This application example relates to all the described embodiments.

FIG. 9 has already been described. When the joints described above with reference to FIGS. 1 to 6 are used as joints 55a and 55b, the lifespan of the joints is extended due to the function of the flexible trunnion filled by the second elastic element which absorbs the major portion of the conical deformations and relieves in a corresponding manner the assembly forming the hydroelastic spring. The axis of the joints 55a and 55b can also be orientated as a function of the fixing and spatial requirement constraints, without seeking to limit severely the conical deformations undergone by the joints. The joints 55a and 55b thus chosen can adopt angles of conical deformation reaching 25° or more with a satisfactory lifespan.

Hence, with reference to FIG. 9, the angle α can adopt any desired value, for example between 15 and 40°. Preferably, an angle greater than 20° is chosen in order to obtain a sufficient self-steering effect of the rear wheels in the same direction as the front wheels in order to combat oversteering behaviour of the vehicle.

FIG. 7 represents a variant of the axle 51 of FIG. 9 in which the axis of the joints 55a and 55b is orientated vertically. In this case, the vertical deflection of the wheels is manifested entirely by a conical deformation of the joints 55a and 55b.

FIG. 8 represents another variant of the axle 51 of FIG. 9 in which the axis of the joints 55a and 55b is orientated longitudinally. There also, the vertical deflection of the wheels is manifested by a conical deformation of the joints 55a and 55b.

Nevertheless, FIGS. 7 to 9 represent three particular orientations and any intermediate orientation can also be used according to requirements. One possibility for assembling the joints to the arms 53*a* and 53*b* is to force-fix the external reinforcement 1 in a bush which is integral with the corresponding arm. The edge 30 of the first embodiment comes therefore to abut against this bush when the axial deformation of the joint reaches a prescribed limit, for example 2 to 4 mm. The internal reinforcement 3 is fixed to the body of the vehicle by means of a screw engaged in the interior space 33. An inverse assembly is likewise possible.

Although the invention has been described in connection with several particular embodiments, it is very evident that it is in no way limited thereto and that it comprises all the equivalent techniques of the described means and their combinations if the latter are within the scope of the invention.

Hence, although the reinforcements are axisymmetrical in the represented embodiments, the latter can also not have a symmetry of revolution but have a symmetry of the order n, n being a whole number greater than or equal to 2, about their axis or have an elongated shape about their longitudinal axis without particular symmetry.

In non-operational state, the external and internal reinforcements are not necessarily coaxial. They can have parallel axes which are offset transversely or secant axes.

What is claimed is:

1. Hydroelastic joint for assembling pieces of a structure and for damping vibrations transmitted between said pieces, said joint being suitable for assembly of ground contact members to a main structure of a vehicle, said joint comprising:
    an external reinforcement and an internal reinforcement, each reinforcement having a longitudinal axis, wherein said external reinforcement and said internal reinforcement are disposed one around the other and intended to be fixed respectively to one and to the other of said pieces to be assembled;
    an intermediate reinforcement;
    an assembly forming a hydroelastic spring disposed between said external reinforcement and said intermediate reinforcement in order to permit a relative transverse displacement between said external reinforcement and said intermediate reinforcement, said assembly comprising a first elastically deformable element shaped in order to delimit between said external reinforcement and said intermediate reinforcement a sealed volume containing damping fluid;
    a plurality of longitudinal bosses separating said sealed volume into a plurality of chambers; and
    a second elastically deformable element being disposed between said intermediate reinforcement and said internal reinforcement, wherein said second elastically deformable element forms an elastic spring and has a longitudinal dimension less than a corresponding longitudinal dimension of said first elastically deformable element, in order to limit a transverse deformation of said first elastically deformable element during a relative tilting of said longitudinal axes of said external reinforcement and said internal reinforcement about at least one transverse tilting axis, said longitudinal dimension of each of said first and second elastically deformable elements being defined as an axial dimension of a portion that substantially fills a radial space between corresponding ones of said reinforcements,
    wherein said intermediate reinforcement is disposed between said first and second elastically deformable elements, said first and second elastically deformable elements adhere without interruption to said intermediate reinforcement, wherein said second elastically deformable element adheres without interruption to said internal reinforcement, and wherein said intermediate reinforcement and said internal reinforcement each comprises a cylindrical central portion with a constant cross-section.

2. Hydroelastic joint according to claim 1, characterized in that said first elastically deformable element has two end walls in order to define said sealed volume between said end walls, said first elastically deformable element being provided with a peripheral reinforcement for rigidification at least at a level of said end walls in order to receive a reinforcement by fixing without adhesion in order to ensure impermeability of said volume of damping fluid.

3. Hydroelastic joint according to claim 2, characterized in that said end walls connect in a sealed manner said intermediate reinforcement and said external reinforcement in order to define said sealed volume between said intermediate reinforcement and said external reinforcement, said first elastically deformable element receiving by fixing without adhesion said intermediate reinforcement and said external reinforcement.

4. Hydroelastic joint according to claim 1, characterised in that said sealed volume is divided by said plurality of longitudinal bosses into said plurality of chambers according to a first transverse direction defining a hydraulic damping direction of said assembly forming said hydroelastic spring, said assembly further comprising means for putting said plurality of chambers in communication in order to cause a hydraulic damping of said vibrations transmitted between said external reinforcement and said intermediate reinforcement at least according to said first transverse direction.

5. Hydroelastic joint according to claim 4, characterised in that said means for putting said plurality of chambers in communication includes at least one valve lip fixed to said plurality of longitudinal bosses in order to come into contact with said intermediate reinforcement and said external reinforcement, said at least one valve lip being able to be folded back in order to put said plurality of chambers in communication when a pressure difference between said plurality of chambers exceeds a threshold value.

6. Hydroelastic joint according to claim 4, characterised in that said first elastically deformable element has a plurality of limit stops projecting substantially at a centre of each chamber in order to limit a deflection between said external reinforcement and said intermediate reinforcement according to said first transverse direction.

7. Hydroelastic joint according to claim 6, characterised in that said plurality of limit stops are pretensioned in transverse compression between said intermediate reinforcement and said external reinforcement.

8. Hydroelastic joint according to claim 1, wherein said second elastically deformable element has a rigidity which is less in at least one second transverse direction in order to define, perpendicularly to said second transverse direction, a preferential transverse tilting axis for said relative tilting of the axes of said external reinforcement and said internal reinforcement.

9. Hydroelastic joint according to claim 8, characterised in that said sealed volume is divided into said plurality of chambers according to a first transverse direction defining a hydraulic damping direction of said assembly forming said hydroelastic spring, and said first transverse direction and said second transverse direction are parallel.

10. Hydroelastic joint according to claim 8, characterised in that said sealed volume is divided into said plurality of chambers according to a first transverse direction defining a hydraulic damping direction of said assembly forming said hydroelastic spring, and said first transverse direction and said second transverse direction form an angle θ.

11. Hydroelastic joint according to claim 8, 9 or 10, characterised in that said second elastically deformable element has at least two cells which are substantially longitudinal and opposite in said second transverse direction.

12. Hydroelastic joint according to claim 1, 2, 3, 4, 5, 6, 7, 8, 9, or 10, characterised in that said first and second elastically deformable elements are obtained in a single moulding step.

13. Hydroelastic joint according to claim 1, 2, 3, 4, 5, 6, 7, 8, 9, or 10, characterised in that said internal reinforcement is of an overall tubular shape and has a thickened or enlarged, or thickened and enlarged, wall section at a level of at least one of its longitudinal ends in order to provide an increased contact surface with a piece to which said internal reinforcement must be fixed or with means used for fixing said internal reinforcement to said piece.

14. Hydroelastic joint according to claim 1, 2, 3, 4, 5, 6, 7, 8, 9, or 10, characterised in that said joint includes at least one external portion that is able to abut on one of said pieces of said structure to be assembled in order to prevent a deformation of said joint beyond a prescribed amplitude limit.

15. Axle for an automotive vehicle comprising a beam bearing symmetrically at each of its ends a respective wheel support, said beam being provided symmetrically with two joints in order to assemble said beam to a main structure of said automotive vehicle and to damp vibrations, characterised in that said joints are hydroelastic joints according to claim 1, 2, 3, 4, 5, 6, 7, 8, 9, or 10.

16. Axle according to claim 15, characterised in that said joints are fixed to said beam in order that a respective axis of each of said joints forms an angle α greater than 20° with a direction defined by two wheel supports.

17. Hydroelastic joint for assembling two pieces of a structure and for damping vibrations transmitted between each piece, said joint being suitable for assembly of ground contact members to a main structure of a vehicle, said joint comprising:

an external reinforcement and an internal reinforcement, each reinforcement having a longitudinal axis, wherein said reinforcements are disposed one around the other and intended to be fixed respectively to one and to the other of said pieces to be assembled;

an assembly forming a hydroelastic spring disposed between said reinforcements in order to permit a relative transverse displacement between said reinforcements, said assembly comprising a first elastically deformable element shaped in order to delimit between said reinforcements at least one sealed volume containing damping fluid;

a second elastically deformable element being disposed between said assembly forming said hydroelastic spring and said internal reinforcement, wherein said second elastically deformable element has recesses in an axially outer portion thereof, in order to limit a transverse deformation of said first elastically deformable element during a relative tilting of the longitudinal axes of said reinforcements about at least one transverse tilting axis; and an intermediate reinforcement disposed between said first and second elastically deformable elements, said first and second elastically deformable elements adhering on a central portion with a constant cross-section of said intermediate reinforcement, and said second elastically deformable element adhering on a central portion with a constant cross-section of said internal reinforcement, said second elastically deformable element comprising cells positioned within said recesses, said cells having a radial dimension less than a radial dimension of said recesses.

\* \* \* \* \*